May 6, 1969

J. M. GRAY 3,442,144

CONTROL APPARATUS

Filed July 14, 1965

Sheet _1_ of 2

INVENTOR.
JUNIOR MERLE GRAY
BY
Roger W. Jensen
ATTORNEY

United States Patent Office 3,442,144
Patented May 6, 1969

3,442,144
CONTROL APPARATUS
Junior Merle Gray, Coon Rapids, Minn., assignor to Honeywell Inc., Minneapolis, Minn., a corporation of Delaware
Filed July 14, 1965, Ser. No. 471,850
Int. Cl. G01c 19/28
U.S. Cl. 74—5.6                                    3 Claims

ABSTRACT OF THE DISCLOSURE

A gyroscope rotor pickoff utilizing the Doppler shift of laser radiation impinging on the rotor to indicate the speed and direction of movement of the rotor in three locations. From this information a computer may calculate the attitude of the rotor.

---

The present invention pertains to means, in combination with a support member and a spherically-shaped rotor member universally supported by said support member, for sensing and measuring the orientation of the spin axis of the rotor relative to the support member. The invention is more specifically concerned with the field of gyroscopic instruments and is herein explained with reference thereto. It should be understood, however, that the unique and novel principles and apparatus hereinafter taught are equally applicable in any similar measurements where the spin axis of a rotating body is to be determined.

In the prior art, a preferred form of gyroscope involves the use of a spherical rotor universally supported in a housing by an electrostatic field, gas bearing, or the like. Various techniques have been used to determine the orientation of the spin axis of a rotor relative to the housing, an example of one of these techniques being taught by the W. H. Kunz Patent 2,959,060. All of the prior art techniques involved inscribing some sort of pattern onto the surface of the rotor which may be monitored optically or otherwise to provide an indication of the orientation of the spin axis relative to the housing. A surface pattern of this nature is injurious to the symmetry of the rotor and disturbs the continuity of the electric field or gas jet which is supporting the rotor. Thus, the performance and stability of prior art gyroscopes have suffered somewhat with the readout techniques previously used. The present invention operates using a rotor with a uniformly smooth surface so that the gas bearing or the electrostatic field are not affected by a surface pattern.

Briefly, my invention makes use of a plurality of lasers which project coherent beams of light at the smooth surface of the rotor so that the reflection of the laser beam from the microscopic inperfections in the surface is Doppler shifted by an amount proportional to the speed of the surface at that point. Measuring the Doppler shift provides information regarding the speed of the surface at that point. By using information from two mutually orthogonally positioned lasers, the direction of rotation may be ascertained. This information supplied from at least two points about the rotor may be used by a computer to determine the spin axis orientation relative to the housing. It is an object, therefore, of this invention to provide an improved control apparatus and more specifically to provide a pickoff for measuring the spin axis orientation of a smooth spherical rotor in a universally supporting housing.

Other and more specific objects of the invention will be set forth more fully in the following specification and drawings in which.

Figure 1:
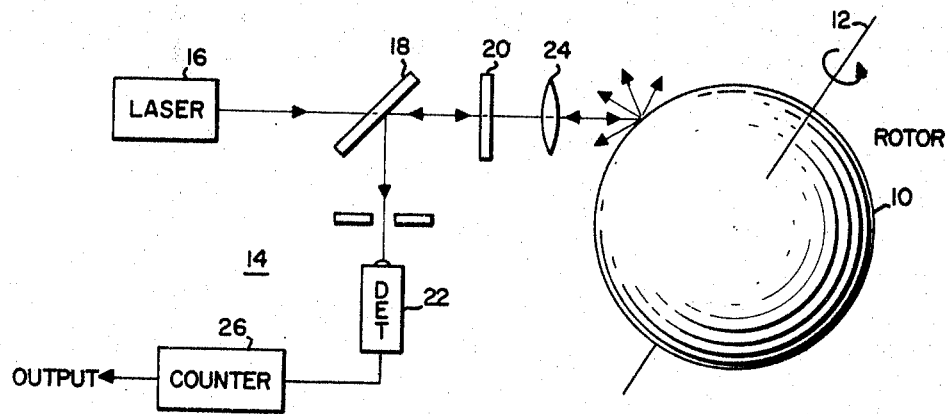
FIGURE 1 is a schematic representation of the laser system as it is used to measure the surface speed of a spinning rotor.

Referring to FIGURE 1, a spherically shaped rotor 10 is shown rotating about a spin axis 12. Reference numeral 14 generally depicts a pickoff unit comprising a laser 16, a detector 22, and an optical system for comparing the direct and reflected laser beams. Laser 16 is utilized to project substantially coherent monochromatic light through a partially transparent beam splitter 18 and a partially transparent mirror 20. A portion of the laser beam is reflected by mirror 20 and directed downward onto detector 22 by beam splitter 18. The remaining portion of the laser beam is focused by a lens 24 onto the surface of rotor 10 at a predetermined angle whereupon part of the beam is reflected back through lens 24 and half-silvered mirror 20 to beam splitter 18, whence, it is reflected to detector 22. Although a good portion of the beam is reflected off of the rotor in a non-useful direction there are many minute imperfections and undulations over the surface of the ball which will reflect light which is Doppler shifted due to the motion of the rotor at the point of incidence. Since the beam is caused to be slightly conical by lens 24 and also has a finite width the Doppler shift in frequency actually covers a narrow band of frequencies of which the average frequency is of interest. This average frequency is strongly predominate and may be compared with the original frequency to determine the component of surface velocity along the axis of the beam from which the velocity at the point of incidence may be determined. The original frequency and the Doppler shifted frequency reflected from beam splitter 18 produce a beat frequency which is received by detector 22. Detector 22 may be a photo-diode or any other device suitably sensitive to the appropriate light energy. The beat frequency received by detector 22 is then presented to a counter 26. Counter 26 by recording the number of beats per second has an output signal which is proportional to the surface velocity of the rotor 10 at the point that the laser beam impinges. If two pick-off units such as unit 14 are positioned orthogonally to measure the velocity at the same point, the direction of surface movement at that point may be determined therefrom. To better understand how this results in information regarding the orientation of the spin axis reference should be had to FIGURE 2.

Figure 2:
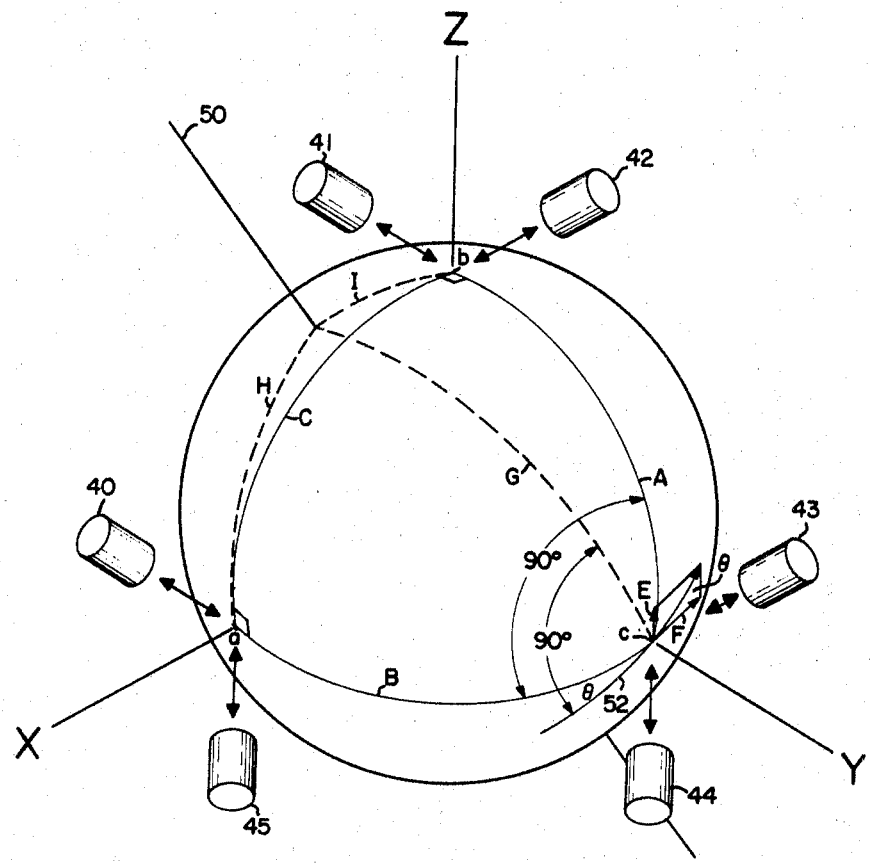
FIGURE 2 is a schematic drawing showing one possible arrangement of the laser pickoff units in order to ascertain the position of the spin axis.

In FIGURE 2 six pickoff units of the variety illustrated in FIGURE 1 are shown and numbered 40–45. The pickoffs are divided into three groups of orthogonal pairs. Each pair is capable of determining the direction of surface motion at the point of question. For example, pickoffs 40 and 45 operate at a point $a$, pickoffs 41 and 42 operate at a point $b$ and pickoffs 43 and 44 operate at a point $c$ on the surface of the sphere. These points are chosen to correspond to where the X, Y, and Z axis of a Cartesian coordinate system, centered at the center of the rotor, pass through. Three mutually orthogonal great circle arcs A, B, and C are shown connecting each of the three points where the X, Y, and Z axes emerge from the sphere at points $a$, $b$, and $c$ respectively. Pickoff unit 43 is positioned so as to measure the surface velocity of the sphere along the great circle arc A while pickoff 44 is arranged to measure the velocity along the great circle arc B. The sphere in FIGURE 2 is shown rotating about a spin axis 50 and the direction of surface motion through point $c$ is given by an arrow 52 and is at an angle $\theta$ from arc B. At the point where the Y axis passes through the sphere, pickoffs 43 and 44 determine the velocity components E and F of the motion at $c$ and a comparison of the components will give the tangent of the angle $\theta$.

As stated the direction of motion 52 is displaced from the great circle arc B by an angle $\theta$, so it follows that the perpendicular to the direction of motion 52 which is shown by dashed line G is displaced from the arc A by the angle $\theta$. Since the direction of motion of the surface of the sphere is always in a plane which is perpendicular to the spin axis, the perpendicular G drawn from the direction of motion on the surface of the sphere will intersect the spin axis. Thus, by taking measurements at the points a, b, and c and extending perpendiculars from the direction of motion at these three points, the perpendiculars, shown in FIGURE 2 as dashed lines G, H, and I, will all intersect at the spin axis 50. Although in general only two measurements need be taken in order to determine the location of the spin axis 50 a third measurement is desirable in the event that the spin axis 50 should correspond to one of the points that is being measured in which case the measurement at that point would be indeterminate.

It should be understood that although each of the pairs of pickoffs in FIGURE 2 is shown in an orthogonal configuration and that the measurements are made at the intersection of orthogonal great circle arcs that this need not necessarily be the arrangement of components used. Any of a variety of positions of pickoffs will serve to provide measurements of the direction of motion of the surface of the sphere from which the spin axis may be determined. Thus, any variation or modification of the arrangement of components from those described still fall within the spirit and scope of the present invention.

Figure 3:
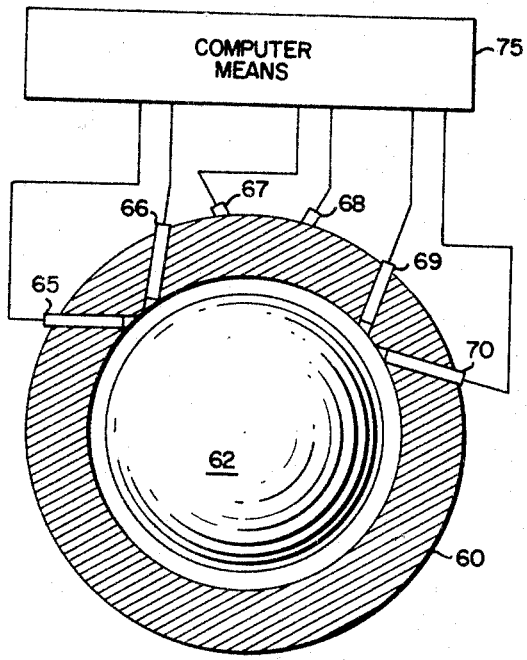
FIGURE 3 is a further schematic drawing showing one possible embodiment of the present invention.

The spherical trigonometry calculations hereinbefore described may be performed by a suitable computing means such as used in FIGURE 3. In FIGURE 3 a housing 60 is shown universally supporting a rotor 62. Six pickoffs numbered 65–70 are shown mounted in housing 60 in a manner similar to that described with reference to FIGURE 2. The outputs from each pickoff unit are supplied to a computer means 75 which may be a direction cosine computer or any other computer suitable to perform the spherical trigonometry problems required. The computer means must compare the outputs from each pair of pickoffs so as to determine the direction of motion of the surface at the points in question and then determine the line in space that is defined by the intersection of the two planes which are perpendicular to the directions of motion at the points.

Many modifications and variations may be made to the apparatus shown. For instance, the optics of the laser pickoff unit may be varied greatly and still perform the function of directing a laser beam onto the surface of a rotor and mixing the laser beam with the reflected Doppler shifted laser beam so as to record a beat frequency representative of the surface velocity of the rotor. Also the angle at which the laser beam strikes the rotor may be varied as desired within wide limits and still impinge so that the microscopic imperfections in the surface will return a useable Doppler shifted light beam. Thus, I do not intend the present invention to be limited to the apparatus and embodiments shown except as defined by the appended claims.

I claim:
1. Apparatus to measure the position of the spin axis of a spherically shaped rotor, which rotor is universally supported in a housing, comprising:
   a plurality of lasers mounted to the housing in a position suitable to project substantially coherent monochromatic light onto the rotor;
   optical means mounted to the housing, operable to compare the frequency of light reflected from the rotor with the frequency of the projected light in orthogonal directions at a plurality of locations so as to indicate by the difference therebetween the direction of motion of the rotor surface at the plurality of locations; and
   computing means connected to the optical means to calculate the spin axis orientation from the direction of surface motion at the plurality of locations.

2. In apparatus of the class described the combination of:
   a support;
   a spherical rotor universally supported by said support and adapted to rotate about a spin axis; and
   means for determining the orientation of said spin axis relative to said support comprising a plurality of pickoffs operable to project coherent light onto a plurality of locations on the surface of said rotor and to receive the Doppler shifted reflections therefrom, a plurality of detectors adapted to measure the difference in frequency between said coherent light and said Doppler shifted reflections as a measure of the direction of rotation at the location, and computer means connected to said detectors operable to calculate the orientation of said spin axis from the directions of rotation at said locations.

3. In apparatus of the class described the combination of:
   a support;
   a spherical rotor universally supported by said support and adapted to rotate about a spin axis; and
   means for determining the orientation of said spin axis relative to said support comprising three pairs of lasers operable to project coherent light orthogonally onto three locations on the surface of said rotor, an optical system to receive the Doppler shifted reflections from the three locations and direct them to detectors adapted to measure the difference in frequency between said coherent light and the Doppler shifted reflections as a measure of direction of rotation at the location, and a computer connected to said detectors operable to calculate the orientation of said spin axis from the directions of rotation at the locations.

References Cited

UNITED STATES PATENTS

| | | | |
|---|---|---|---|
| 3,150,363 | 9/1964 | Finvold. | |
| 3,277,304 | 10/1966 | Vyce | 74—5.6 |
| 3,328,595 | 6/1967 | Todd | 74—5.6 |

OTHER REFERENCES

Paper presented at East Coast Conference on Aerospace and Navigational Electronics on Oct. 21, 1964 by G. Stavis at Baltimore, Md., 9 pp.

C. J. HUSAR, *Primary Examiner.*

U.S. Cl. X.R.

74—5.7